Sept. 16, 1958

R. SEYFARTH 2,851,894

VARIABLE DIAMETER PULLEY

Filed July 11, 1955

INVENTOR.
Robert Seyfarth
BY
L. D. Busch
ATTORNEY ated Sept. 16, 1958

United States Patent Office 2,851,894
Patented Sept. 16, 1958

2,851,894

VARIABLE DIAMETER PULLEY

Robert Seyfarth, Mason, Mich., assignor to General Motors Corporation, Detroit, Mich., a corporation of Delaware Application July 11, 1955, Serial No. 521,228

1 Claim. (Cl. 74—230.17)

This invention relates to devices in which centrifugal force acting on a body of liquid contained between rotating parts causes axial displacement between the parts, and more particularly to such a device of extremely simple design and having means for containing the liquid without the use of the usual seals.

While devices such as variable diameter V-belt pulley drives and the like in which liquid under the action of centrifugal force causes axial displacement between the halves of the pulley are known, their use has sometimes been economically prohibitive and otherwise undesirable due to intricate design thereof requiring a number of seals and other elements which are subject to failure.

It is now proposed to provide a device of this kind having a minimum number of parts and requiring none of the usual seals since the liquid is contained in a completely enclosed, hollow flexible torus disposed between the parts for rotation therewith. The device is thus very inexpensive to manufacture and install and substantially foolproof in operation.

Figure 1:
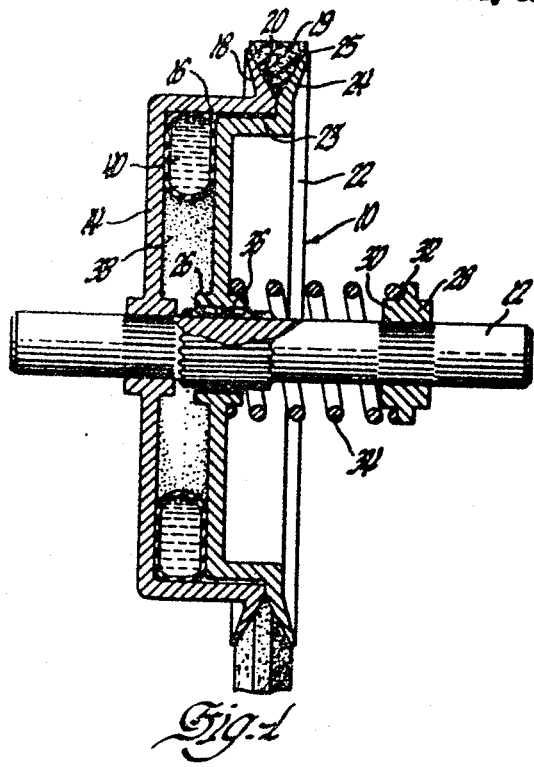
Figure 1 is an axial cross-sectional view of a device embodying the invention in the inoperative position.

Referring to the drawings in greater detail, Figure 1 illustrates only one of a number of possible embodiments of the invention, namely a variable diameter V-belt pulley assembly.

The assembly 10 comprises a rotatable drive or driven shaft 12 having secured thereto by any suitable means or formed integrally therewith an annular pulley half 14 characterized by a cylindrical recess 16 and an annular flange 18 having a tapered face 20. Thus, the pulley half 14 rotates with the shaft 12. Also secured for rotation with the shaft 12 is a second pulley half 22 having a cylindrical body 23 adapted to be received in the cylindrical recess 16 and an annular flange 24 also having a tapered face 25 so that a V-belt 19 may be received between the flanges 18 and 24.

The spline connection 26 between the shaft 12 and the pulley half 22 not only causes these parts to rotate together, but also permits axial movement of pulley half 22 along shaft 12. Any other suitable equivalent connection may be employed in place of the spline connection 26.

A collar 28 is fixed to the shaft on the side of pulley half 22 opposite pulley half 14, the collar having a guide portion 30 and a shoulder 32. It is apparent that an integral shoulder would serve equally well in the place of the separate collar.

A coil spring 34 is positioned on the shaft 12 so that its ends abut against the pulley half 22 around the hub 36 and the shoulder 32. The spring thus urges the pulley half 22 toward the pulley half 14 so that the cylindrical body 23 is normally positioned within the cylindrical recess 16, with the flanges 18 and 24 in engagement, as shown by Figure 1. Here again, any other equivalent spring device could be employed in the place of coil spring 34.

Figure 3:
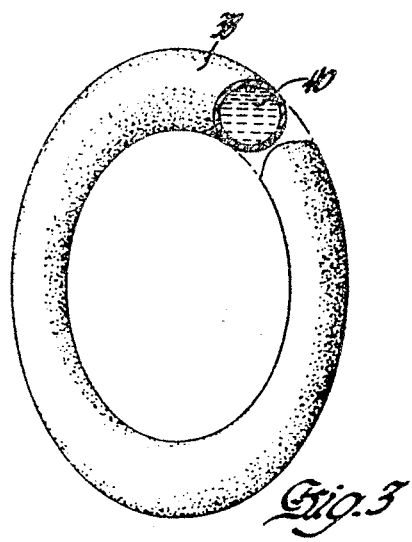
Figure 3 is an enlarged perspective view partly in cross-section and illustrating a structural element of the invention.

A thin-walled, hollow, completely enclosed torus 38 made of flexible material such as rubber or the like and filled with a liquid 40 is positioned in the recess 16. The torus 38 preferably has a circular cross-section as shown by Figure 3, although other cross-sectional shapes could be employed. The outer diameter of the torus 38 is preferably greater than the diameter of the recess 16 so that the torus will have sufficient frictional engagement with the assembly 10 to rotate therewith. Also, the cross-sectional diameter of the torus is greater than the normal axial spacing between pulley halves 14 and 22.

Figure 1 illustrates the assembly 10 in the inoperative or nonrotating position in which the torus 38 will be compressed axially between pulley halves 14 and 22 due to the action of the spring 34 on the pulley half 22. The torus or container 38 therefor assumes a generally rectangular cross section.

Figure 2:
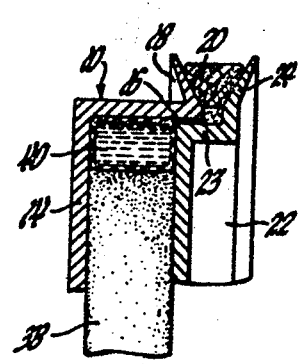
Figure 2 is a fragmentary cross-sectional view similar to Figure 1 and illustrating the device in the operative position.

When the assembly 10 is caused to rotate at high speeds, the liquid is thrown to the outer periphery of the recess 16 which causes the flexible torus 38 to assume an oppositely flattened shape approaching that shown by Figure 2. The generally rectangular shape maintained by the container 38 when in position allows the center of mass of the liquid 40 and the container to have a maximum rotational path diameter at all times, thus obtaining the maximum effect from a given quantity of liquid. This naturally forces the pulley half 22 to the right against the spring 34 and separates the flanges 18 and 24 so that the V-belt 19 drops lower between the flanges. It is preferable, however, to provide a spring 34 having sufficient tension to overcome the natural tendency of the V-belt to spread the pulley halves. The exact cross-sectional shape of the torus 34 depends, of course, on the rotational speed of the assembly 10 and it varies between the extremes shown by Figures 1 and 2. At any rate, there is a gradual automatic adjustment of the effective pulley diameter as the assembly 10 increases or decreases in rotational velocity.

It is to be noted that the proposed structure is extremely simple in design and it has been found to be fool-proof and effective in operation, particularly since few moving parts and no seals of any kind are required.

In an actual test an axial force of 110 pounds was produced by a one-half inch deflection at 3200 R. P. M. with a 6-inch diameter torus filled with plain water. The use of a heavier fluid, such as a calcium chloride solution for example, would give more force.

It is apparent that many variations in the preferred embodiment shown and described are possible without departing from the scope of the invention. For instance, both of the pulley halves could be provided with shallower recesses and they need not telescope, and both pulley halves could be spring loaded for axial movement in opposite directions.

The device is adapted for other applications, such as a clutch or a governor, in which case rattling produced by the usual weights, levers, etc., would be eliminated. Also, a pair of variable diameter pulleys of the type shown could be employed to provide an automatic change speed mechanism similar to a Reeves drive.

What is claimed is:

A variable diameter pulley assembly comprising, a rotatable drive shaft having external splines formed thereon, a first annular pulley half including a cylindrical recess formed by a first radially extending portion and a first cylindrical portion, said first radially extending portion being axially and nonrotatably secured to said shaft for rotation therewith, said first pulley half having an annular flange formed on and extending radially outward of said first cylindrical portion, said flange having a tapered face defining one pulley surface, a second annular pulley half formed to include a second radially extending portion and a second cylindrical portion telescopically received within said first cylindrical portion radially inward of said first pulley half annular flange and having an annular flange extending radially outward therefrom axially adjacent said first pulley half annular flange, said second annular flange having a tapered face defining the other pulley surface, said second radially extending portion having internal splines formed therein and engaging said drive shaft splines to permit axial but not rotating movement of said second pulley half relative to said second pulley half, means mounted on said shaft for biasing said second radial and cylindrical portions into said first cylindrical portion, and flexible sealed fluid containing expansible means received between said first and second radial portions and within said first cylindrical portion for rotation therewith, said expansible means axially expanding against said radial portions under centrifugal force to move said pulley halves apart a distance proportional to the speed of said shaft, thereby varying the working diameter of the pulley.

References Cited in the file of this patent

UNITED STATES PATENTS

| | | |
|---|---|---|
| 1,618,644 | Dickson | Feb. 22, 1927 |
| 2,310,081 | Hill | Feb. 2, 1943 |
| 2,543,337 | Salsbury | Feb. 27, 1951 |
| 2,612,055 | Miner | Sept. 30, 1952 |

FOREIGN PATENTS

| | | |
|---|---|---|
| 407,730 | Great Britain | Mar. 23, 1934 |